UNITED STATES PATENT OFFICE.

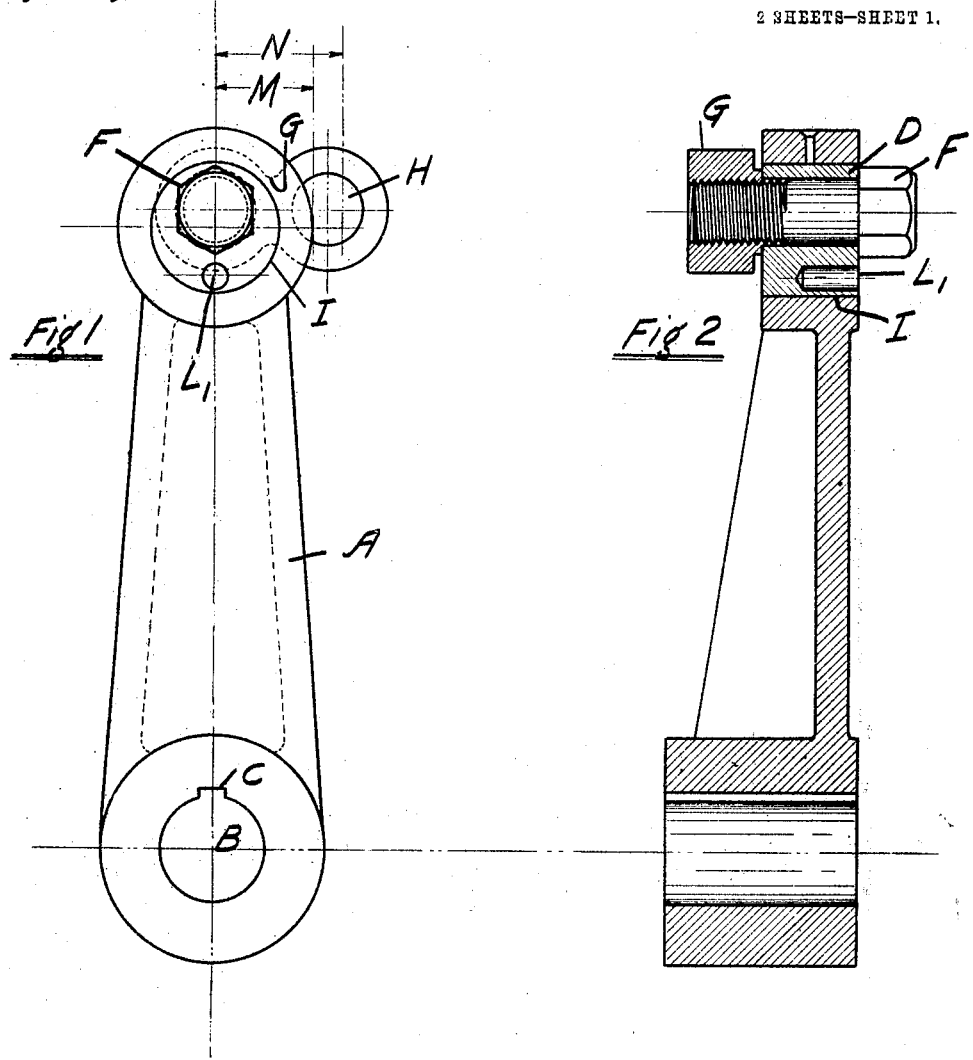

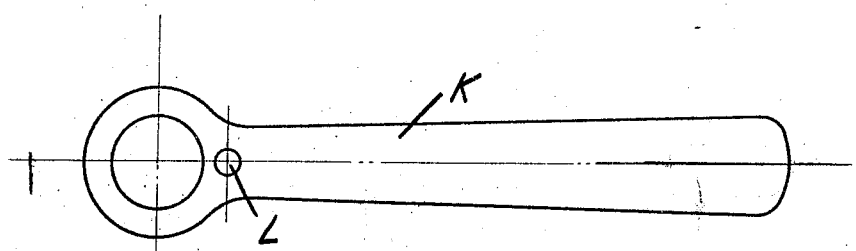
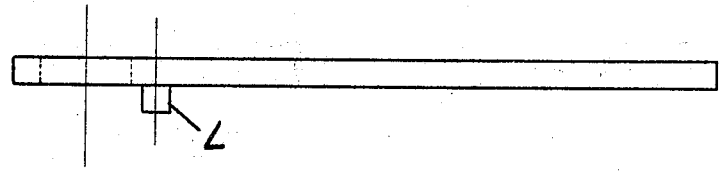
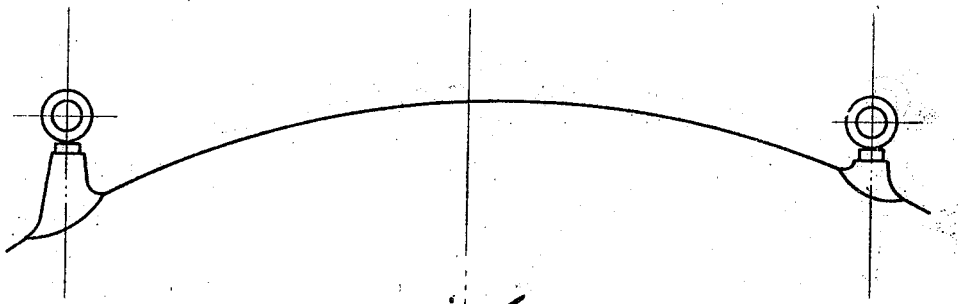
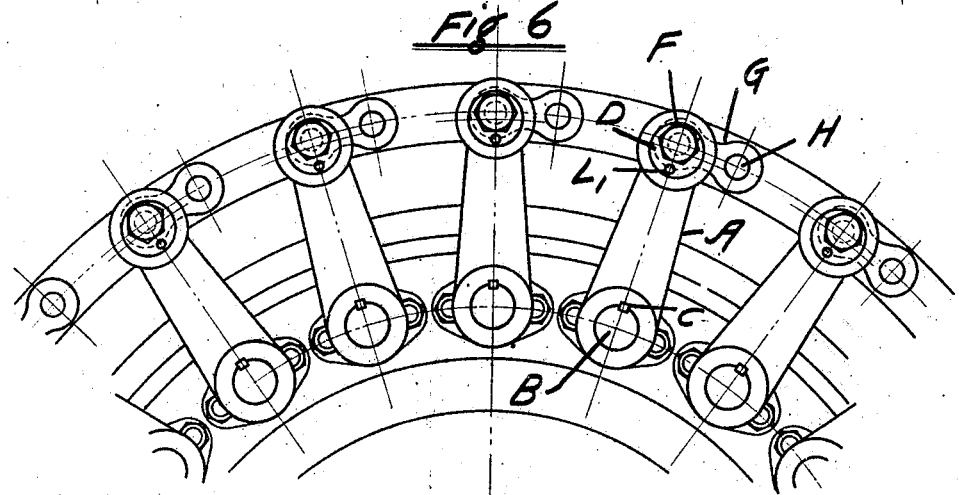

GEORGE J. HENRY, JR., OF SAN FRANCISCO, CALIFORNIA.

ADJUSTABLE LEVER AND LINK.

1,092,102.

Specification of Letters Patent. Patented Mar. 31, 1914.

Application filed October 5, 1912. Serial No. 724,143.

*To all whom it may concern:*

Be it known that I, GEORGE J. HENRY, Jr., a citizen of the United States, residing in San Francisco, in the county of San Francisco and State of California, have invented a new and useful Adjustable Lever and Link, of which the following is a specification.

The transmission of mechanical motion through the instrumentality of a lever and connecting piece in all kinds of machinery is usually accomplished through the pivoting of the connecting piece on a pin or fulcrum made solid with the arm of the lever and in cases where the pin is placed in the connecting piece, it swivels in a hole in the lever, thus preventing any adjustment of the length of the connecting rod or piece.

In the case of the wicket gates of turbine water wheels for which my adjustable connecting lever is particularly adapted, there are a number of gate stems on which the levers are fitted each usually with a key and each lever is then provided with a connecting link engaging with a rigid ring concentric with the entire set of gate connections—the partial rotation of this gate ring will then cause the swinging of all the levers and therefore the wicket gates causing all the gates to swing the same amount. When swinging in one direction all the gates open and in the opposite direction they all close—the closure must be accurate to prevent water leakage—and it sometimes happens that, due to stones or sticks getting in some of the passage ways, the movement to close the gates forces some of them against the obstruction, causing a bending of the gate stem or other parts and thus distorting the position of some of the gates more than the others and preventing full closure and otherwise disturbing the action and results obtained from the machine. Also in machining and assembling the different parts it is frequently found that slight differences exist preventing all the gates occupying exactly the same position with respect to the gate ring and governing or controlling apparatus. To overcome these difficulties and secure a perfect adjustment of the different parts with respect to each other and with respect to the primary source of movement, I construct the levers and connecting rods as shown in the accompanying drawings in which—

Figure 1 is a front view of the adjustable lever connection with parts assembled; Fig. 2 a cross section at right angles thereto through the several parts; Fig. 3 the preferred form of fulcrum block; Fig. 4 cross section of fulcrum block; Fig. 5 the spanner and wrench showing mode of making the adjustment; Fig. 6 showing a portion of the gate ring and my adjustable lever connections applied to a turbine water wheel.

While here described and illustrated as applied to the gate operating mechanism of turbine water wheels it must be borne in mind that I do not limit myself to its application to this class of apparatus as it can readily be used in various classes of apparatus and machines for accomplishing the same useful purpose.

Similar letters refer to similar parts throughout the several views.

The lever A is carried on the shaft B to which it is secured by the key C. The opposite end of the lever A is drilled out to receive the fulcrum block or pivot D in which is bored the hole E off center. Block D turns freely in lever A without lost motion. This block may be provided with a shoulder to prevent its displacement where necessary although in ordinary cases it may be made without this. Also the link or connecting rod G may serve as a shoulder on the opposite side. This fulcrum block D is secured by the capscrew F and about which the block D may freely turn until clamped, the hole E being provided to fit over same freely but without lost motion. The screw F is threaded into the connecting rod or link G which may be connected at its other end by a suitable pin H. If now the screw F be tightened against the block D in the threads of the connecting rod G, then block D is held against rotation and it may swivel freely in the lever about the circular joint I. If the screw F be loosened and the block D turned partially around by the spanner K, whose projecting pin L engages into the hole L', and the screw F again clamped the distance between the centers of the pin H and the center of rotation of the block D will have been increased or decreased and it will be seen that by 180 degrees of rotation the distance between the centers may be varied as indicated in Fig. 1 from M to N thus enabling an adjustable movement of the shaft B with respect to the center of the pin H.

5. The connecting rod or link G may be made of any length and the eccentric adjusting block D may be set at either end or it may be clamped to the lever A or on the part to which the pin H is affixed and secure the same result.

I claim—

1. The combination of two members and a link, one of said members being provided with a cylindrical opening, an adjustable block therein, said block being provided with an eccentric opening, and a pin in said opening having devices for clamping the block and the link.

2. In gate operating mechanism, the combination of a member to be moved, an adjustable pivot block rotatably mounted therein, said block having an eccentric opening, and a pin in said opening provided with clamping devices.

GEORGE J. HENRY, Jr.

Witnesses:
PERCY E. CECIL,
ELSIE YOUNG.